(12) United States Patent
Deckers et al.

(10) Patent No.: US 6,348,547 B1
(45) Date of Patent: Feb. 19, 2002

(54) OXIDIZED METALLOCENE-POLYOLEFIN WAXES

(75) Inventors: Andreas Deckers, Flomborn; Arend Jouke Kingma, Ludwigshafen; Ulrich Moll, St Martin; Wilhelm Weber, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/171,824

(22) PCT Filed: Apr. 24, 1997

(86) PCT No.: PCT/EP97/02098

§ 371 Date: Oct. 27, 1998

§ 102(e) Date: Oct. 27, 1998

(87) PCT Pub. No.: WO97/41158

PCT Pub. Date: Nov. 6, 1997

(30) Foreign Application Priority Data

Apr. 30, 1996 (DE) .......................... 196 17 230

(51) Int. Cl.⁷ .................................. C08F 8/06
(52) U.S. Cl. ..................... 525/333.8; 525/388
(58) Field of Search .............. 525/333.8, 388

(56) References Cited

U.S. PATENT DOCUMENTS

| | | |
|---|---|---|
| 3,278,513 A | 10/1966 | Jahrstorfer et al. ........... 260/94 |
| 3,756,999 A | 9/1973 | Stetter et al. |
| 4,794,096 A | 12/1988 | Ewen |
| 5,023,388 A | 6/1991 | Lueker |
| 5,328,969 A | 7/1994 | Winter et al. |
| 5,374,752 A | 12/1994 | Winter et al. |
| 5,455,365 A | 10/1995 | Winter et al. |
| 5,723,705 A | 3/1998 | Herrmann et al. |

FOREIGN PATENT DOCUMENTS

| | | |
|---|---|---|
| CA | 2024718 | 1/1991 |
| CA | 2099214 | 12/1993 |
| DE | 1301094 | 7/1963 |
| DE | 1645415 | 9/1970 |
| EP | 284 708 | 10/1988 |
| EP | 452 840 | 10/1991 |
| EP | 487 278 | 5/1992 |
| JP | 51041787 | 4/1976 |
| WO | 88/02009 | 3/1988 |
| WO | 93/03067 | 2/1993 |
| WO | 93/24539 | 12/1993 |
| WO | 95/14044 | 5/1995 |

OTHER PUBLICATIONS

*Ullmann's Enc. der tech. Chem.*, 4th Ed., vol. 24, pp. 40–44, 1983.
Kunststoff–Handbunch, vol. 4, 161ff, Hanser–Verlag 1969.
Jrl. Org. Chem, 369, 1989, 359–370.

Primary Examiner—Bernard Lipman
(74) Attorney, Agent, or Firm—Keil & Weinkauf

(57) ABSTRACT

Oxidized waxes are obtainable by oxidation of polyolefins obtainable by means of metallocene catalysis and having a molecular weight Mw in the range from 1000 to 40,000 g/mol.

8 Claims, No Drawings

OXIDIZED METALLOCENE-POLYOLEFIN WAXES

The present invention relates to oxidized waxes obtainable by oxidation of polyolefins obtainable by means of metallocene catalysis and having a molecular weight Mw in the range from 1000 to 40,000 g/mol. The polyolefins obtainable by means of metallocene catalysis are, in the interest of simplicity, hereinafter referred to as metallocene polyolefins.

In addition, the present invention relates to a process for preparing oxidized polyolefin waxes by oxidation of polyolefins having a molecular weight $M_w$ in the range from 1000 to 40,000 g/mol using oxygen-containing agents at from 140 to 350° C., and also to the use of oxidized waxes as or in coating compositions, as or in floor polishes and to the use of oxidized polyolefin waxes as or in coating compositions for citrus fruits.

Oxidized polyolefin waxes are already known. They are generally obtained by oxidation of, in general low molecular weight, Ziegler polyethylene, Phillips polyethylene (HDPE) or high-pressure polyethylene (LDPE) using air or pure oxygen, Kunststoff-Handbuch, volume 4, p. 161 ff. Carl-Hanser-Verlag, 1969.

Such oxidized waxes are already used as coating compositions for various applications, for example in the surface treatment of floors or citrus fruits.

The polyolefin wax oxidation forms, inter alia, carboxyl groups in or on the polymer chains of the starting polyolefin, the number of which can be determined by means of the acid number. A high acid number of the waxes is generally advantageous since the waxes can be dispersed and applied better.

In the oxidation of known Phillips polyethylene waxes, Ziegler polyethylene waxes or, in particular, high-pressure polyethylene waxes, a great reduction in the melting point of the oxidized waxes compared to the starting polymer is observed and this is associated with an undesired reduction in the hardness of the oxidized waxes. However, a high hardness and thus a high melting point of the oxidized waxes is advantageous for use as or in coating compositions, for example in floor polishes or for preserving citrus fruits.

Furthermore, the oxidation of the known polyolefin waxes results in an unfavorable ratio of acid number to saponification number of <1:1 and this generally has an adverse effect on the dispersibility of the waxes in aqueous media. The dispersibility can generally be improved by increasing acid number and saponification number.

It is an object of the present invention to find a remedy to the disadvantages mentioned and to provide, in particular, oxidized polyolefin waxes having a relatively high molecular weight and at the same time a high acid number, high saponification number and comparatively high hardness, and also a high melting point. Furthermore, it is an objective of the present invention to provide an oxidation process for polyolefins which makes it possible to obtain oxidized polyolefin waxes having the abovementioned desired properties.

We have found that these objects are achieved by oxidized waxes obtainable by oxidation of polyolefins obtainable by means of metallocene catalysis and having a molecular weight $M_w$ in the range from 1000 to 40,000 g/mol and a process for preparing oxidized polyolefin waxes by oxidation of polyolefins having a molecular weight Mw in the range from 1000 to 40,000 g/mol using oxygen-containing agents at from 140 to 350° C., wherein the polyolefins used are ones which are obtainable by means of metallocene catalysis.

The present invention also provides for the use of oxidized waxes as or in coating compositions, the use of oxidized waxes as or in floor polishes and the use of oxidized waxes as or in coating compositions for citrus fruits.

The polyolefins on which the oxidized waxes are based have a weight average molecular weight $M_w$, determined by gel permeation chromatography (GPC) in 1,2,4-trichlorobenzene at 135° C. using a polyethylene or polypropylene standard, in the range from 1000 to 40,000 g/mol, preferably in the range from 2000 to 20,000 g/mol. The polydispersity $M_w/M_n$ of the polyolefins on which the oxidized waxes are based, measured by GPC as described, is generally in the range from 1.5 to 3.0, preferably in the range from 1.8 to 2.5.

The polyolefins on which the oxidized waxes are based can be obtained by polymerization of the corresponding monomers in the presence of metallocene catalysts (metallocene catalysis).

Well suited monomers are ethylene and $C_3$–$C_{10}$-alk-1-enes, i.e. propylene, 1-butene, 1-pentene, 1-hexene, 1-heptene, 1-octene, 1-nonene, 1-decene. Preference is given to using ethylene and/or propylene as monomers.

The monomers can be homopolymerized or copolymerized with one another in any ratio. Preferred polyolefins on which the oxidized waxes are based are ethylene homopolymers having a density in the range from 0.90 to 0.98 g/cm$^3$, preferably in the range from 0.94 to 0.97 g/cm$^3$, and an $M_w$, determined by GPC as described above, in the range from 1000 to 40,000 g/mol, preferably in the range from 2000 to 20,000 g/mol.

Other suitable starting polyolefins are ethylene-$C_3$–$C_{10}$-alk-1-ene copolymers containing a total of from 0.1 to 15 mol %, preferably from 1 to 10 mol %, mol %, based on the copolymer, of structural units derived from the alk-1-ene or alk-1-enes. Preferred ethylene-alk-1-ene copolymers are ethylene-propylene copolymers containing from 0.1 to 10 mol %, preferably from 1 to 5 mol %, based on the copolymer, of structural units derived from the propylene. The copolymers generally have an $M_w$, determined by GPC as described above, in the range from 1000 to 40,000 g/mol, preferably in the range from 2000 to 20,000 g/mol.

Further preferred polyolefins on which the oxidized waxes are based are isotactic propylene homopolymers having an isotactic pentad mnmnmm content, determined by $^{13}$C-NMR spectroscopy, in the range from 90 to 98% and an Mw, determined by GPC as described above, in the range from 1000 to 40,000 g/mol, preferably in the range from 2000 to 20,000 g/mol.

Other suitable base polyolefins are copolymers of propylene with ethylene and/or $C_4$–$C_{10}$-alk-1-enes. These propylene copolymers usually contain a total of from 0.1 to 15 mol %, preferably from 1 to 10 mol %, based on the copolymer, of structural units derived from the ethylene and/or the $C_4$–$C_{10}$-alk-1-enes. Preferred propylene copolymers are propylene-ethylene copolymers containing from 0.1 to 10 mol %, preferably from 1 to 5 mol %, based on the copolymer, of structural units derived from the ethylene. The propylene copolymers generally have an $M_w$, determined by GPC as described above, in the range from 1000 to 40,000 g/mol, preferably in the range from 2000 to 20,000 g/mol.

The monomers are homopolymerized or copolymerized in the presence of metallocene catalysts (metallocene catalysis).

For the purposes of the present invention, metallocene catalysts are substances which are generally formed by combining a transition metal compound or a plurality of transition metal compounds, preferably of titanium, zirconium or hafnium, which contain at least one ligand which is in the widest sense a derivative of cyclopentadienyl ligands with an activator, also known as cocatalyst or compound capable of forming metallocenium ions, and are generally polymerization-active toward the monomers described. Such catalysts are described, for example, in EP-A 0 545 303, EP-A 0 576 970 and EP-A 0 582 194. The catalyst systems according to the present invention generally comprise as active constituents A) a metallocene complex or a plurality of metallocene complexes of the formula (I)

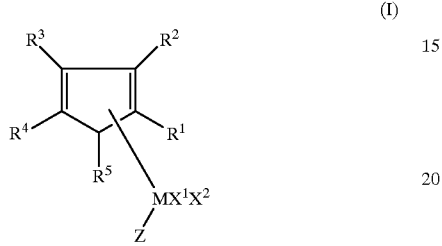

(I)

where the substituents and indices have the following meanings:

M is titanium, zirconium, hafnium, vanadium, niobium, tantalum, chromium, molybdenum or tungsten, $X^1$, $X^2$ are fluorine, chlorine, bromine, iodine, hydrogen, $C_1$–$C_{10}$-alkyl, $C_6$–$C_{15}$-aryl, —$OR^6$ or —$NR^6R^7$, where $R^6$, $R^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{20}$-alkyl, 5- to 7-membered cycloalkyl which may in turn bear a $C_1$–$C_{10}$-alkyl group as substituent, $C_6$–$C_{15}$-aryl or arylalkyl, or two adjacent radicals may together form a cyclic group having from 4 to 15 carbon atoms, or $Si(R^8)_3$, where $R^8$ is $C_1$–$C_{10}$-alkyl, $C_6$–$C_{15}$-aryl or $C_3$–$C_{10}$-cycloalkyl, Z is $X^1$, $X^2$ or

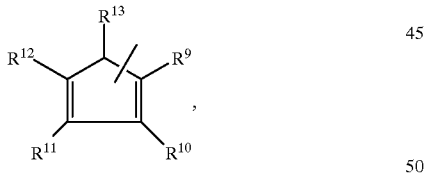

where the radicals $R^9$ to $R^{13}$ are hydrogen, $C_1$–$C_{20}$-alkyl, 5- to 7-membered cycloalkyl which may in turn bear a $C_1$–$C_{10}$-alkyl group as substituent, $C_6$–$C_{15}$-aryl or arylalkyl, or two adjacent radicals may together form a cyclic group having from 4 to 15 carbon atoms, or $Si(R^{14})_3$ where $R^{14}$ is $C_1$–$C_{10}$-alkyl, $C_6$–$C_{15}$-aryl or $C_3$–$C_{10}$-cycloalkyl, or the radicals $R^4$ and Z together form a —$[Y(R^{15})(R^{16})]_n$—E— group in which Y can be identical or different and are each silicon, germanium, tin or carbon, $R^{15}$, $R^{16}$ are hydrogen, $C_1$–$C_{10}$-alkyl, $C_3$–$C_{10}$-cycloalkyl or $C_6$–$C_{15}$-aryl, n is 1, 2, 3 or 4, E is

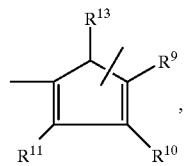

or A, where A is —O—, —S—,

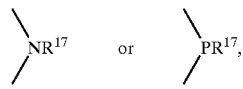

where $R^{17}$ is $C_1$–$C_{10}$-alkyl, $C_6$–$C_{15}$-aryl, $C_3$–$C_{10}$-cycloalkyl, alkylaryl or $Si(R^{18})_3$ where $R^{18}$ is $C_1$–$C_{10}$-alkyl, $C_6$–$C_{15}$-aryl, $C_3$–$C_{10}$-cycloalkyl or alkylaryl and B) is a compound capable of forming metallocenium ions.

Well suited transition metal compounds (I) are

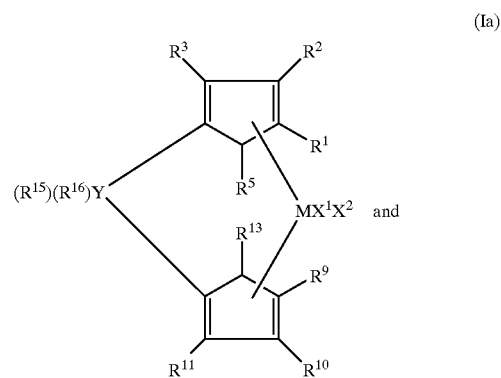

(Ia)

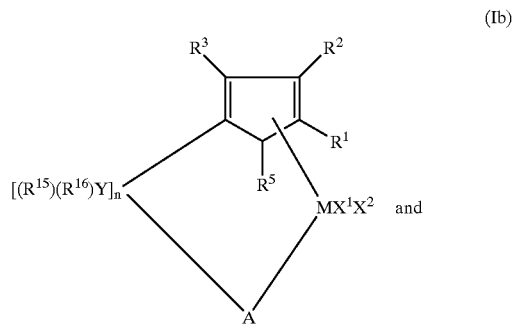

(Ib)

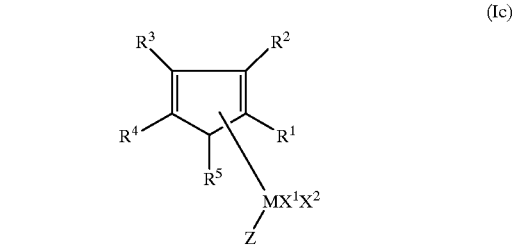

(Ic)

where Z is $X^1$, $X^2$ or where $R^4$ and Z do not form a
$-[Y(R^{15})(R^{16})]_n-E-$ group.

Thus, the term metallocene complex or metallocene does not only refer to the bis(η-cyclopentadienyl)metal complexes and their derivatives.

The radicals $X^1$, $X^2$ can be identical or different; they are preferably identical.

Particularly useful compounds of the formula (Ia) are those in which $R^1$ and $R^9$ are identical and are hydrogen or a $C_1$–$C_{10}$-alkyl group, $R^5$ and $R^{13}$ are identical and are hydrogen, methyl, ethyl, isopropyl or tert-butyl, $R^2$, $R^3$, $R^{10}$ and $R^{11}$ have the meanings $R^3$ and $R^{11}$ are $C_1$–$C_4$-alkyl, $R^2$ and $R^{10}$ are hydrogen or two adjacent radicals $R^2$ and $R^3$ or $R^{10}$ and $R^{11}$ together form a cyclic group having from 4 to 12 carbon atoms, $R^{15}$, $R^{16}$ are $C_1$–$C_8$-alkyl, M is titanium, zirconium or hafnium, Y is silicon, germanium, tin or carbon and $X^1$, $X^2$ are chlorine or $C_1$–$C_4$-alkyl.

Examples of particularly useful complexes are, inter alia:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)-zirconium dichloride,
dimethylsilanediylbis(3-tert-butyl-5-ethylcyclopentadienyl)-zirconium dichloride,
dimethylsilanediylbis(3-tert-butyl-5-methylcyclopentadienyl)-dimethylzirconium,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)-zirconium dichloride,
dimethylsilanediylbis(3-ethyl-5-isopropylcyclopentadienyl)-5 zirconium dichloride,
dimethylsilanediylbis(2-methylindenyl)dimethylzirconium,
dimethylsilanediylbis[3,3, '-(2-methylbenzindenyl)]zirconium dichloride,
dimethylsilanediylbis(2-methylindenyl)hafnium dichloride,
dimethylsilanediylbis[3,3'-(2-methylbenzindenyl)]hafnium dichloride,
dimethylsilanediylbis[3,3,-(2-methylbenzindenyl)]dimethyl-zirconium.

Particularly useful compounds of the formula (Ib) are those in which

M is titanium or zirconium, $X^1$, $X^2$ is chlorine or $C_1$–$C_{10}$-alkyl,

Y is silicon or carbon when n=1 or is carbon when n=2, $R^{15}$, $R^{16}$ is $C_1$–$C_8$-alkyl, $C_5$- or $C_6$-cycloalkyl or $C_6$–$C_{10}$-aryl, A is —O—, —S—, and $R^1$ to $R^3$ and $R^5$ are hydrogen, $C_1$–$C_{10}$-alkyl, $C_3$–$C_{10}$-cycloalkyl, $C_6$–$C_{15}$-aryl or Si($R^8$)$_3$, or two adjacent radicals form a cyclic group having from 4 to 12 carbon atoms.

Particularly useful compounds of the formula (Ic) are those in which Z is $X^1$ or $X^2$ and $X^1$ and $X^2$ are identical. Preferably, $X^1$, $X^2$ are then halogen or $C_1$–$C_4$-alkyl and $R^1$ to $R^5$ in (Ic) are then $C_1$–$C_4$-alkyl.

When Z in (Ic) is $X^1$, $X^2$ are preferably halogen or $C_1$–$C_4$-alkyl and $R^1$ to $R^5$ and $R^9$ to $R^{13}$ are preferably hydrogen, $C_1$–$C_{20}$-alkyl, such as methyl, ethyl, n-propyl, tert-butyl, n-hexyl, n-octyl, in particular octadecyl.

Examples of particularly useful compounds (Ic) are pentamethyl- cyclopentadienyltrimethyltitanium, pentamethylcyclopentadienyl- titanium trichloride and bis(octadecylcyclopentadienyl)zirconium dichloride, biscyclopentadienylzirconium dichloride, bis(pentamethylcyclopentadienyl)zirconium dichloride, bis(methylcyclo- pentadienyl)zirconium dichloride, bis(n-butylcyclopentadienyl)- zirconium dichloride, bis(n-octadecylcyclopentadienyl)zirconium dichloride.

Such transition metal compounds (I) can be synthesized by methods known per se, preferably by reacting the appropriately substituted cycloalkenyl anions with halides of the transition metals, for example titanium, zirconium, hafnium, vanadium, niobium, tantalum, chromium, molybdenum or tungsten. Examples of appropriate preparative methods are described, inter alia, in Journal of Organometallic Chemistry, volume 369 (1989), pages 359 to 370.

Compounds B) capable of forming metallocenium ions are known to those skilled in the art and are described, for example, in WO 95/14044.

Well suited compounds B) are, for example, open-chain or cyclic aluminoxane compounds of the formula (II) or (III)

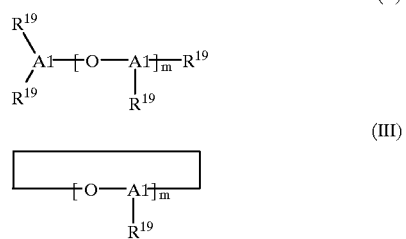

where $R^{19}$ is a $C_1$–$C_4$-alkyl group, preferably a methyl or ethyl group, and m is an integer from 5 to 30, preferably from 10 to 25.

The preparation of these oligomeric aluminoxane compounds is usually carried out by reacting a solution of trialkylaluminum with water and is described, inter alia, in EP-A 284 708 and U.S. Pat. No. 4,794,096.

The oligomeric aluminoxane compounds obtained in this way are generally in the form of mixtures of both linear and cyclic chain molecules of different lengths, so that m is to be regarded as a mean value. The aluminoxane compounds can also be present in admixture with other metal alkyls, preferably aluminum alkyls.

It has been found to be advantageous to use the metallocene complexes and the oligomeric aluminoxane compound in such amounts that the atomic ratio of aluminum from the oligomeric aluminoxane compound to the transition metal from the metallocene complexes is in the range from 1:1 to $10^5$:1, in particular in the range from 100:1 to 1000:1.

As compounds B) capable of forming metallocenium ions, it is also possible to use coordination compounds selected from the group consisting of strong, uncharged Lewis acids.

Preferred strong, uncharged Lewis acids are compounds of the formula IV $$M^2 X^3 X^4 X^5 \qquad (IV),$$

where
- $M^2$ is an element of main group III of the Periodic Table, in particular B, Al or Ga, preferably B,
- $X^3$, $X^4$ and $X^5$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls such as fluoroaryls, preferably pentafluorophenyl.

Particular preference is given to compounds of the formula (IV) in which $X^3$, $X^4$ and $X^5$ are identical, preferably tris(pentafluoro-phenyl)borane. These compounds and methods of preparing them are known per se and are described, for example, in WO 93/3067.

It has been found to be particularly useful for the molar ratio of boron from the compound capable of forming metallocenium ions to transition metal from the metallocene complex to be in the range from 0.1:1 to 10:1, in particular in the range from 1:1 to 5:1.

The compounds B) capable of forming metallocenium ions are usually used alone, in admixture with one another or in admixture with organometallic compounds of the first to third main groups of the Periodic Table of the Elements, for example n-butyllithium, di-n-butylmagnesium, butyloctylmagnesium, trimethylaluminum, triethylaluminum, triisobutylaluminum, diisobutylaluminum hydride; the mixing ratio of the components is generally not critical.

Preference is given to using $C_1$–$C_{10}$-alkylaluminoxanes, in particular methylaluminoxanes, as compound B) capable of forming metallocenium ions.

The preparation of the polymers from the olefinically unsaturated hydrocarbons can be carried out in the customary reactors, either continuously or preferably batchwise.

Suitable reactors are, inter alia, continuously operated stirred vessels; if desired, a cascade comprising a plurality of stirred vessels connected in series can also be used. The polymerization reactions can be carried out in the gas phase, in suspension, in liquid or supercriticial monomers or in inert solvents.

The polymerization conditions are not critical per se. Pressures of from 0.1 to 500,000 kPa, preferably from 100 to 250,000 kPa p and in particular from 100 to 100,000 kPa, and temperatures of from 0 to 450° C., preferably from 20 to 250° C. and in particular from 50 to 100° C., have been found to be suitable.

The mean molecular weight of the polymers can be controlled by the methods customary in polymerization technology, for example by feeding in molecular weight regulators, e.g. hydrogen, which generally lead to a reduction in the molecular weight of the polymer or by varying the polymerization temperature, in which case high polymerization temperatures usually lead to reduced molecular weights.

Suitable processes for preparing polyolefin waxes by means of metallocene catalysis are described in WO 88/02009 (high-pressure process) and in EP-A 0 321 851, EP-A 0 416 566 and EP-A 0 571 882.

In a preferred process, polyethylene waxes in particular are prepared by polymerization of ethylene under high-pressure conditions. For this purpose, the ethylene and any further $C_3$–$C_{10}$-alk-1-enes desired are compressed to pressures above 50,000 kPa, preferably from 100,000 to 350,000 kPa. To initiate the polymerization, a catalyst solution comprising a suitable activator (for example aluminum alkyl and/or methylaluminoxane) or a borate (e.g. N,N-dimethylanilinium tetrakis(pentafluoro- phenyl)borate, is then added. The reaction temperature generally rises to values up to 300° C., preferably to from 200 to 250° C. The form of the reactor is not critical per se; conceivable configurations are a continuously operated tube reactor or a continuously operated stirring autoclave. To prepare the polyolefin oxidates of the present invention, a particularly suitable catalyst system is bis(n-butylcyclopentadenyl) zirconium dichloride activated with N,N-dimethylanilinium tetrakis(penta- fluorophenyl)borate.

The oxidation of the polyolefins on which the oxidized waxes are based can be carried out using oxygen, oxygen-containing gases, preferably air. Preference is given to using air for oxidizing the polyolefins. To aid the oxidation, it is possible to add organic peroxides such as di-tert-butyl peroxide; the addition of heavy metal salts such as manganese acetate is also conceivable.

Suitable oxidation processes for polyolefin waxes are known from, for example, DE-A-2035706.

In a preferred process, the metallocene polyolefin according to the present invention, preferably an ethylene homopolymer, is reacted with oxygen-containing gases, preferably air, in a tube reactor or a stirring autoclave at from 140 to 350° C., preferably from 150 to 250° C., and a pressure in the range from 100 to 20,000 kPa, preferably in the range from 500 to 4000 kPa. The amount of oxygen fed in is then generally in the range from 0.1 to 1000 l of oxygen/hxkg of wax, preferably in the range from 1 to 50 l of oxgyen/hxkg of wax.

The oxidized polyolefin waxes obtainable in this way, in particular the oxidized waxes from ethylene homopolymer, have a ratio of acid number to saponification number in the range from 1:1 to 1:4, preferably in the range from 1:1 to 1:2.

The acid number was determined by titration in accordance with DIN 53402. The saponification number was determined by titration in accordance with DIN 53401. Suitable acid numbers are 1–150 mg KOH/g, preferably 10–50 mg KOH/g and particularly preferably 15–30 mg KOH/g. The melting point of the oxidized waxes of the present invention, determined by Differential Scanning Calorimetry (DSC), in accordance with DIN 51007, is usually in a range from 90 to 125° C., preferably from 110 to 125 C.

The hardness of the oxidized waxes of the present invention determined using the ball indentation test, in accordance with DIN 50133, is usually in a range from 800 to 2000 N/mm$^2$, preferably from 1000 to 1500 N/mm$^2$.

The viscosity of the oxidized waxes of the present invention, measured using the Ubbelohde melt visocsity method as 140° C. in accordance with DIN 51562, is usually in the range from 100 to 10,000 cst, preferably from 200 to 5000 cst.

The waxes of the present invention are useful as coating compositions or as a component of coating compositions. The coating composition generally has a high hardness and a high gloss.

EXAMPLES

The examples according to the present invention were carried out using homopolyethylene waxes which had been prepared by polymerization of ethylene by the high-pressure process. The polymerization was carried out in a continuously operated 1 l high-pressure autoclave fitted with a stirring motor. Ethylene and hydrogen were continuously introduced into the autoclave under pressure, with the polymerization pressure in the interior of the autoclave being regulated at 150,000 kPa. In a separate make-up vessel, the solutions of triisobutyl-aluminum in heptane and N,N, dimethylanilinium tetrakis(pentafluorophenyl)borate in toluene were added to a solution of bis(n-butylcyclopentadienyl)zirconium dichloride in a molar ratio of Zr:Al 1:400 and Zr:B 1:1.2. The active catalyst solution was then immediately, without a further residence time, metered continuously into the autoclave and the reaction temperature was held at 240° C. The hydrogen addition was 120 l/h. The starting waxes have the following properties:

| Sample | M.p. 1) [° C.] | Hardness 2) [N/mm$^2$] | Viscosity [140° C.] 3) [cst.] |
|---|---|---|---|
| 1 | 128.3 | 1170 | 350 |
| 1C*) | 128.7 | 1270 | 380 |

*) Ziegler polyethylene wax PE 130 from Hoechst
1) measured in accordance with DIN 51007
2) measured in accordance with DIN 50133
3) measured in accordance with DIN 51562

Examples 1, 1C

The oxidations of the waxes 1 and 1c (see table above) were carried out in a stirred (impeller stirrer) 1l steel autoclave with pressure maintenance device. The wax to be oxidized was placed in the autoclave and heated to 160° C. After the wax had melted, the stirrer was switched on and air was passed through (30l/h kg). The reaction was stopped when the desired acid number had been reached, the oxidized wax was drained off and analyzed.

| Example | M.p. [° C.] | Hardness [bar] | Visc. 140° C. [° C.] | Acid number 1) [mg KOH/g] | Starting wax |
|---|---|---|---|---|---|
| 1 | 121.5 | 730 | 125 | 20.5 | 1 |
| 1C | 117.2 | 660 | 150 | 20.5 | 1V |

1) measured in accordance with DIN 53402

Use examples 20 parts of oxidate wax from Examples 1, 1C were admixed with 2 parts of morpholine and 5 parts of olein in 68 parts of water and heated at 150° C. for 15 minutes in a pressure autoclave. The emulsion obtained in this way was cooled to room temperature, filtered and a sample for measuring the gloss was subsequently taken. 3 ml of the dispersion were placed in a 60 μm box coater and applied to leather; after application, the gloss values [85°] were measured (instrument from Dr. Lange, UME-2 instrument)

| | |
|---|---|
| without coating: | 5.8 |
| with dispersion from Example 1 | 8.6 |
| with dispersion from Example 1V | 6.4 |

We claim:

1. An oxidized wax produced by the process of oxidizing a polyolefin produced by olefin polymerization using metallocene catalysts and having a molecular weight $M_w$ in the range from 1000 to 40,000 g/mol, wherein the ratio of acid number to saponification number of the oxidized wax is in the range from 1:1 to 1:4.

2. An oxidized wax as claimed in claim 1, wherein the polyolefin used is an ethylene homopolymer or copolymer.

3. A process for preparing an oxidized polyolefin wax by oxidation of a polyolefin having a molecular weight $M_w$ in the range from 1000 to 40,000 g/mol using oxygen-containing agents at from 150 to 350° C., wherein the polyolefin used is produced by olefin polymerization using metallocene catalysis.

4. A process as claimed in claim 3, wherein the oxygen-containing agent used is air.

5. A process as claimed in claim 3, wherein the polyolefin used is an ethylene homopolymer or copolymer.

6. A coating composition containing the oxidized wax of claim 1.

7. A floor polish containing the oxidized wax of claim 1.

8. A coating composition for citrus fruits containing the oxidized wax of claim 1.

* * * * *